US008728216B2

(12) United States Patent
Sugiura

(10) Patent No.: US 8,728,216 B2
(45) Date of Patent: May 20, 2014

(54) SHAPED HEAT STORAGE MATERIALS

(75) Inventor: Masahiro Sugiura, Anjo (JP)

(73) Assignee: Aisan Kogyo Kabushiki Kaisha, Obu-Shi, Aichi-Ken (JP)

( * ) Notice: Subject to any disclaimer, the term of this patent is extended or adjusted under 35 U.S.C. 154(b) by 226 days.

(21) Appl. No.: 13/170,419

(22) Filed: Jun. 28, 2011

(65) Prior Publication Data

US 2012/0006504 A1 Jan. 12, 2012

(30) Foreign Application Priority Data

Jul. 8, 2010 (JP) ................................. 2010-155445

(51) Int. Cl.
*F02M 25/08* (2006.01)
(52) U.S. Cl.
USPC ............................. 96/126; 96/146
(58) Field of Classification Search
USPC ............ 123/519; 96/108, 121, 126, 146, 147, 96/153
See application file for complete search history.

(56) References Cited

U.S. PATENT DOCUMENTS

| 5,861,050 | A * | 1/1999 | Pittel et al. ........................ 95/115 |
| 6,200,681 | B1 * | 3/2001 | Jahns et al. .............. 428/402.24 |
| 7,670,412 | B2 * | 3/2010 | Kido et al. ........................ 96/147 |
| 7,785,407 | B2 * | 8/2010 | Abe et al. .......................... 96/153 |
| 7,841,321 | B2 * | 11/2010 | Kosugi et al. .................. 123/519 |
| 7,909,919 | B2 * | 3/2011 | Kosugi et al. ..................... 96/126 |
| 8,177,893 | B2 * | 5/2012 | Kosugi .............................. 96/126 |
| 8,323,450 | B2 * | 12/2012 | Seki .............................. 156/335 |
| 2005/0247202 | A1 * | 11/2005 | Seki ................................ 96/146 |
| 2009/0266236 | A1 * | 10/2009 | Kosugi et al. .................... 96/152 |
| 2012/0012474 | A1 * | 1/2012 | Yamada et al. ............... 206/205 |

FOREIGN PATENT DOCUMENTS

| JP | 2005-233106 | | 9/2005 |
| JP | 2005-233106 | A | 9/2005 |
| JP | 2005-325707 | | 11/2005 |
| JP | 2008-527156 | A | 7/2008 |
| JP | 2009-264273 | A | 11/2009 |
| WO | WO 2009/145020 A1 * | | 3/2009 |

OTHER PUBLICATIONS

Japanese Final Office Action mailed Dec. 17, 2013, corresponding to Japanese Patent Application No. 2010-155445; with English translation attached.

* cited by examiner

*Primary Examiner* — Frank Lawrence
(74) *Attorney, Agent, or Firm* — Ladas & Parry LLP

(57) ABSTRACT

A shaped heat storage material has a shaped body composed of a binder and heat storage capsules containing a heat storage material therein. And, the shaped body has at least one of a projection, a depressed portion and a hollow structure defining a hollow space therein.

6 Claims, 4 Drawing Sheets

SHAPED HEAT STORAGE MATERIALS

CROSS-REFERENCES TO RELATED APPLICATIONS

This application claims priority to Japanese patent application serial number 2010-155445, the contents of which are incorporated herein by reference.

BACKGROUND OF THE INVENTION

1. Field of the Invention

This disclosure relates to heat storage materials used for treatment of vaporized fuel and adsorbent canisters containing such heat storage material.

2. Description of the Related Art

A vehicle such as gasoline vehicle has an adsorbent canister (fuel vapor treating apparatus) filled with an adsorbent capable of adsorbing and desorbing fuel vapor vaporized in a fuel tank in order to prevent the fuel vapor from flowing outside of the vehicle. The adsorbent canister temporarily traps the fuel vapor while the vehicle is parked. The fuel vapor trapped in the adsorbent canister is removed by flowing ambient air into the adsorbent canister while the vehicle is driving, and then the fuel vapor mixed with the ambient air is burned in an internal combustion engine of the vehicle. In a case that the adsorbent is composed of activated carbon or the like, as the temperature of the adsorbent becomes higher, the adsorbent has lower adsorption capacity. Thus, when the fuel vapor adsorbs onto the adsorbent, the temperature of the adsorbent increases due to exotherm caused by adsorption of the fuel vapor, so that adsorption ability of the adsorbent decreases. On the contrary, when the fuel vapor desorbs from the adsorbent, the temperature of the adsorbent decreases due to endotherm caused by desorption of the fuel vapor, so that desorption ability of the adsorbent decreases.

Japanese Laid-Open Patent Publication No. 2005-233106 discloses an adsorbent canister filled with a granulated adsorbent and a shaped heat storage material. The shaped heat storage material is made by enclosing phase-change materials capable of absorbing and releasing heat depending on its liquid-solid phase change into micro capsules and shaping the micro capsules with a binder into ball shape, cylinder shape, polygonal shape or the like. Accordingly, when the fuel vapor adsorbs onto the adsorbent, increase in temperature of the adsorbent can be suppressed due to endotherm caused by melting of the phase-change materials in the microcapsules, whereas when the fuel vapor desorbs from the adsorbent, decrease in temperature of the adsorbent can be suppressed due to exotherm caused by solidification of the phase-change materials. Therefore, temperature alteration of the adsorbent caused by adsorption and desorption of the fuel vapor can be prevented, so that it is able to improve adsorption performance and desorption performance of the adsorbent.

As void ratio of mixture of the adsorbent and the heat storage material filled in the adsorbent canister is higher, the adsorbent canister can more effectively prevent the fuel vapor from flowing into the atmosphere. Thus, there has been a need for improved shaped heat storage material.

SUMMARY OF THE INVENTION

One aspect of this disclosure includes a shaped heat storage material having a shaped body composed of a binder and heat storage capsules containing a heat storage material therein. The shaped body has at least one of a projection, a depressed portion and a hollow structure defining a hollow space therein.

In accordance with this aspect, the inner hollow space, the projection or the depressed portion can keep a void space, so that it is able to increase void ratio of the shaped heat storage material. Thus, when using this shaped heat storage material with an adsorbent for an adsorbent canister, it is able to increase void ratio of mixture of the adsorbent and the shaped heat storage material.

DETAILED DESCRIPTION OF THE PREFERRED EMBODIMENTS

Each of the additional features and teachings disclosed above and below may be utilized separately or in conjunction with other features and teachings to provide improved heat storage materials. Representative examples, which examples utilize many of these additional features and teachings both separately and in conjunction with one another, will now be described in detail with reference to the attached drawings. This detailed description is merely intended to teach a person of skill in the art further details for practicing preferred aspects of the present teachings and is not intended to limit the scope of the invention. Only the claims define the scope of the claimed invention. Therefore, combinations of features and steps disclosed in the following detailed description may not be necessary to practice the invention in the broadest sense, and are instead taught merely to particularly describe representative examples of the invention. Moreover, various features of the representative examples and the dependent claims may be combined in ways that are not specifically enumerated in order to provide additional useful embodiments of the present teachings.

Figure 1:
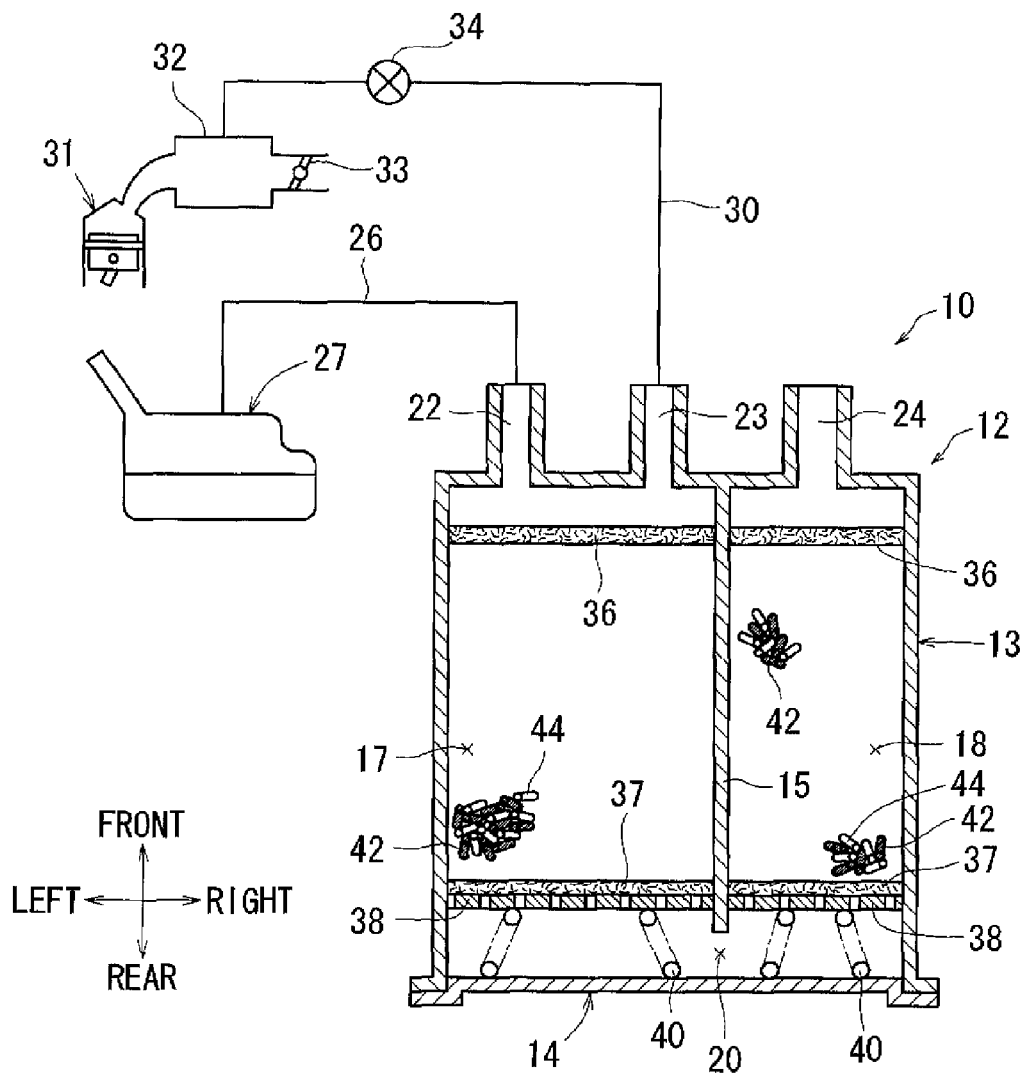
FIG. 1 is a schematic cross-sectional view of an adsorbent canister connected to a fuel tank and to an internal combustion engine.

An embodiment of this disclosure will be described in reference to the attached drawings. An adsorbent canister containing a shaped heat storage material and mounted on a vehicle will be shown. FIG. 1 is a schematic cross-sectional view of the adsorbent canister connected to a fuel tank and an internal combustion engine. For convenience of explanation, directions (i.e., right, left, front and rear) are defined based on FIG. 1.

As show in FIG. 1, an adsorbent canister 10 has a case 12 made from resin materials.

The case 12 is composed of a case body 13 formed in a hollow cylinder shape with a closed front end (upper end in FIG. 1) and an open rear end (lower end in FIG. 1) and a cover 14 configured to close the rear end of the case body 13. An inner space of the case body 13 is divided into a main chamber 17 at a left side and an auxiliary chamber 18 at a right side by a partition wall 15. A communication chamber 20 is defined at a rear section of the case body 13 near the cover 14 such that the main chamber 17 and the auxiliary chamber 18 are fluidly connected with each other via the communication chamber 20.

The case body 13 has on its front surface (an upper surface in FIG. 1) a vapor introducing port 22 and an exhaust port 23 each fluidly connecting with the main chamber 17 and an air communicating port 24 fluidly communicating with the auxiliary chamber 18. The vapor introducing port 22 is connected with a fuel tank 27 (in detail, an upper section of the fuel tank 27 where gases are reserved) via a vapor pipe 26. The exhaust port 23 is connected to an air intake pipe 32 for an internal combustion engine 31 via a purge pipe 30. The air intake pipe 32 is provided with a throttle valve 33 for controlling intake airflow. The purge pipe 30 is connected to the air intake pipe 32 downstream of the throttle valve 33 (i.e., between the internal combustion engine 31 and the throttle valve 33). The purge pipe 30 is provided with a purge valve 34. The air communicating port 24 is open to the atmosphere.

The main chamber 17 is equipped with a front filter 36 at a front end and a rear filter 37 at a rear end. The auxiliary chamber 18 is also equipped with a front filter 36 and a rear filter 37 in a same manner. Each of the filters 36 and 37 is made of a resin-based non-woven cloth, urethane foam or the like. In the main chamber 17 and the auxiliary chamber 18, porous plates 38 are disposed along a rear surface of each rear filter 37. In addition, spring members 40 each composed of a coil spring are disposed between the porous plates 38 and the cover 14.

In the main chamber 17 and the auxiliary chamber 18, a mixture of a granular-shaped adsorbent 42 and a granular-shaped heat storage material 44 is filled between the front filters 36 and the rear filters 37. The adsorbent 42 can be made from known materials suitable for adsorbent, so that such materials will not be described in detail. For example, the adsorbent 42 can be made of granulates of activated carbon. In addition, the granulates of activated carbon can include, for example, granular activated carbon (crushed activated carbon) and extruded activated carbon formed by shaping powdered activated carbon with a binder. The adsorbent 42 can be shaped in, e.g., ball, cylinder, polygonal prism and concave polygonal prism.

The shaped heat storage material 44 are made by enclosing phase-change materials capable of absorbing and releasing heat depending on temperature alteration into micro capsules in order to make heat storage capsules and then shaping the heat storage capsules with a binder. The heat storage capsules can be made from known materials suitable for the heat storage capsule such as those disclosed in Japanese Laid-Open Patent Publication No. 2005-233106, so that the heat storage capsules will not be described in detail. Although various materials can be used for the binder, thermosetting resin such as phenol resin or acrylic resin is preferable in light of strength and stability against temperature required for the adsorbent canister 10 and solvent. The shaped heat storage material 44 and the adsorbent 42 preferably have 0.1-1.5 g/cc of density, respectively. A ratio of the shaped heat storage material 44 to total amount of mixture of the adsorbent 42 and the shaped heat storage material 44 is preferably 5-40% by weight. The shaped heat storage material 44 can be shaped in accordance with known methods such as those disclosed in Japanese Laid-Open Patent Publication No. 2005-233106. For example, the shaped heat storage material 44 can be easily shaped by extruding mixture containing the heat storage capsules and the binders into an elongated cylinder shape and then cutting such extruded product in a predetermined length. Thus, the shaped heat storage material 44 is basically formed in a prism-like shape such as cylinder shape, polygonal prism or the like.

Figure 2:
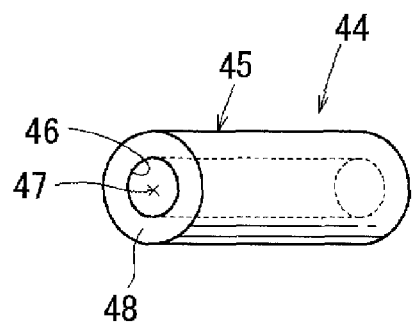
FIG. 2 is a perspective view of a shaped heat storage material.

As shown in FIG. 2, the shaped heat storage material 44 is formed in a hollow cylinder shape. That is, the shaped heat storage material 44 is composed of a shaped body 45 formed in a hollow cylinder shape. The shaped body 45 has a hollow cylinder portion 48 and defines a hollow space 47 that is composed of a through-hole 46 penetrating the shaped body 45 in an axial direction. The shaped heat storage material 44 can be formed in other hollow prism-like shape such as square prism.

Next, operation of a fuel vapor treating system including the adsorbent canister 10 will be described (FIG. 1). The fuel vapor treating system is composed of the adsorbent canister 10, the vapor pipe 26, the fuel tank 27, the purge pipe 30, the air intake pipe 32 and purge valve 34, etc. When the internal combustion engine 31 is stopped, the fuel vapor, e.g., vaporized in the fuel tank 27 flows into the main chamber 17 via the vapor pipe 26. Then, most of the fuel vapor adsorbs onto the adsorbent 42 filled in the main chamber 17. Remaining fuel vapor that has not adsorbed onto the adsorbent 42 in the main chamber 17 flows into the auxiliary chamber 18 via the communication chamber 20 and then adsorbs onto the adsorbent 42 filled in the auxiliary chamber 18. In this state, increase in temperature of the adsorbent 42 caused by exothermal reaction where the fuel vapor adsorbs onto the adsorbent 42 can be suppressed by endotherm caused by phase change (from solid phase to liquid phase) of the phase-change material in the heat storage capsules of the shaped heat storage material 44. Thus, it is able to improve adsorption performance of the adsorbent 42 for the fuel vapor.

On the other hand, in a state that the internal combustion engine 31 is running, when the purge valve 34 is opened, negative pressure in the internal combustion engine 31 can act on the adsorbent canister 10. Due to this action, ambient air flows into the auxiliary chamber 18 via the air communicating port 24. The air introduced into the auxiliary chamber 18 desorbs the fuel vapor from the adsorbent 42 filled in the auxiliary chamber 18. And then, the air flows into the main chamber 17 via the communication chamber 20 and desorbs the fuel vapor from the adsorbent 42 filled in the main chamber 17. In this state, decrease in temperature of the adsorbent 42 caused by endothermal reaction where the fuel vapor is desorbed from the adsorbent 42 is prevented due to exotherm caused by phase change (from liquid phase to solid phase) of the phase-change materials enclosed in the heat storage capsules of the shaped heat storage material 44. Thus, it is able to improve desorption performance where the fuel vapor is desorbed from the adsorbent 42. The air mixed with the fuel vapor that has been desorbed from the adsorbent 42 is discharged (i.e., purged) into the air intake pipe 32 via the purge pipe 30 and then is burned in the internal combustion engine 31.

The shaped heat storage material 44 (FIG. 2) used for the adsorbent canister 10 (FIG. 1) is made by enclosing phase-change materials capable of absorbing and releasing heat depending on temperature alteration into microcapsules in order to make fine heat storage capsules and shaping the heat storage capsules with the binder. The shaped heat storage material 44 is composed of the shaped body 45 having the hollow space 47. The hollow space 47 of the shaped body 45 increases void space, thereby increasing void, ratio of the shaped heat storage material 44.

The hollow space 47 is composed of the through-hole 46 passing through the shaped body 45. Thus, the hollow space 47 can improve ventilation of the shaped heat storage material 44.

The adsorbent canister 10 is filled with a mixture of the shaped heat storage material 44 and the adsorbent 42. Thus, it is able to increase void ratio of such mixture of the shaped heat storage material 44 and the adsorbent 42 by using the shaped heat storage material 44 having larger void ratio. Thus, it is able to decrease diffusive density of the fuel vapor remaining in the adsorbent canister 10 while the vehicle is parked and thus to reduce the amount of the fuel vapor flowing into the atmosphere. In addition, the hollow space 47 improves ventilation of the shaped heat storage material 44, so that it is able to decrease pressure loss in the adsorbent canister 10 filled with the mixture of the shaped heat storage material 44 and the adsorbent 42 in order to make refueling easier.

Figure 3:
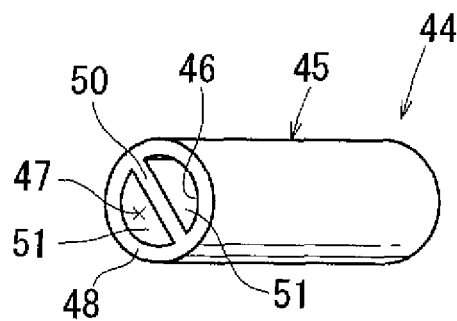
FIG. 3 is a perspective view of a first variant of the shaped heat storage material.

Next, variants of the shaped heat storage material 44 will be described. FIG. 3 shows a first variant of the shaped heat storage material 44. As shown in FIG. 3, the first variant of the shaped heat storage material 44 is composed of the hollow cylinder portion 48 further having a partition 50 extending in the axial direction and dividing the hollow space 47 into two spaces 51 that pass through the shaped body 45. Thus, the partition 50 increases structural strength of the shaped heat storage material 44.

Figure 4:
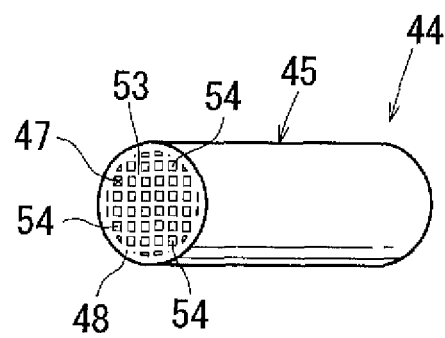
FIG. 4 is a perspective view of a second variant of the shaped heat storage material.

FIG. 4 shows a second variant of the shaped heat storage material. As shown in FIG. 4, the second variant of the shaped heat storage material 44 is composed of the hollow cylinder portion 48 further having a honeycomb-shaped partition 53 dividing the hollow space 47 into many spaces 54. The spaces 54 extend in the axial direction and pass through the shaped body 45. Thus, the partition 53 increases structural strength of the shaped heat storage material 44.

Figure 5:
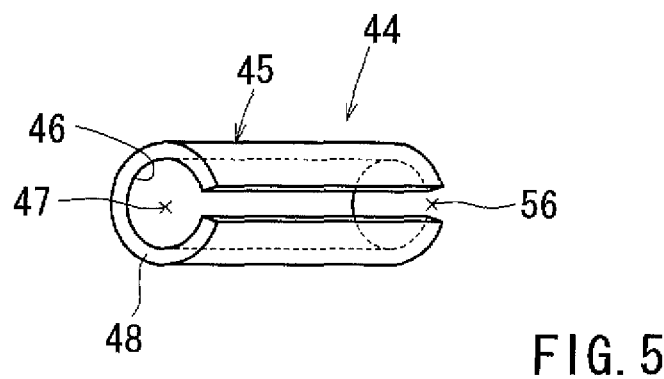
FIG. 5 is a perspective view of a third variant of the shaped heat storage material.

FIG. 5 shows a third variant of the shaped heat storage material. As shown in FIG. 5, the third variant of the shaped heat storage material 44 is composed of the hollow cylinder portion 48 further having a slit 56 extending in the axial direction and passing through the hollow cylinder portion 48 in the radial direction. The slit 56 increases void ratio of the shaped heat storage material 44.

Figure 6:
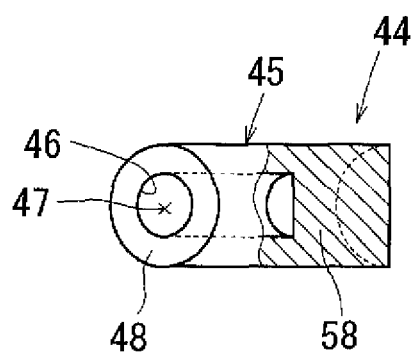
FIG. 6 is a partial cross-sectional perspective view of a fourth variant of the shaped heat storage material.

FIG. 6 shows a fourth variant of the shaped heat storage material. As shown in FIG. 6, the fourth, variant of the shaped heat storage material 44 is composed of the hollow cylinder portion 48 further having a closed end (right end in FIG. 6) that is closed with a blocking portion 58. The blocking portion 58 increases structural strength of the shaped heat storage material 44.

Figure 7:
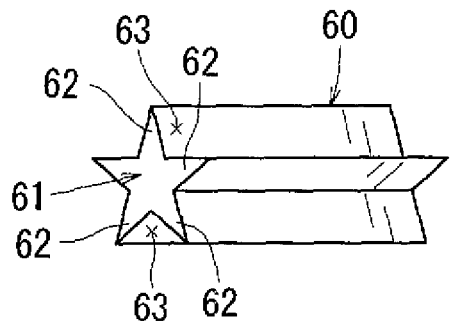
FIG. 7 is a perspective view of a fifth variant of the shaped heat storage material.

FIG. 7 shows a fifth variant of the shaped heat storage material. As shown in FIG. 7, the fifth variant of the shaped heat storage material 60 is formed in a star prism shape having a star shaped cross-section. That is, the shaped heat storage material 60 is composed of a shaped body 61 formed in a pentagonal prism shape and five triangular prisms 62 extending along side surfaces of the shaped body 61 in the axial direction. Thus, the triangular prisms 62 make void spaces 63 between the triangular prisms 62 and thus increase the void ratio of the shaped heat storage material 60.

Figure 8:
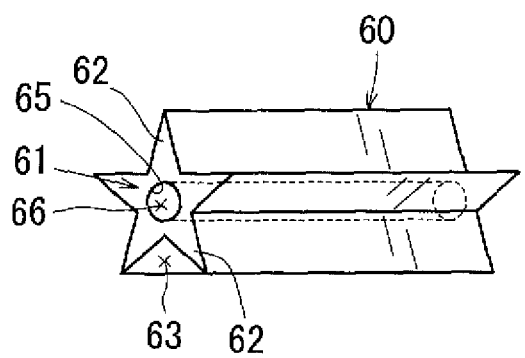
FIG. 8 is a perspective view of a sixth variant of the shaped heat storage material.

FIG. 8 shows a sixth variant of the shaped heat storage material. As shown in FIG. 8, the sixth variant of the shaped heat storage material 60 is composed of the shaped body 61 further having a through-hole 65 passing through the shaped body 61 in the axial direction. The through-hole 65 forms a hollow space 66 and thus increases the void ratio of the shaped heat storage material 60.

Figure 9:
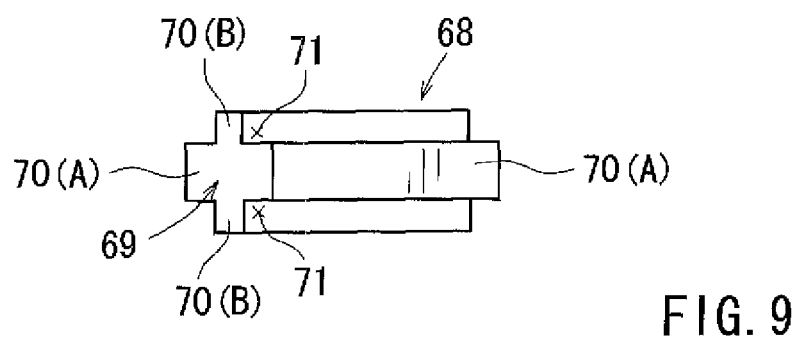
FIG. 9 is a perspective view of a seventh variant of the shaped heat storage material.

FIG. 9 shows a seventh variant of the shaped heat storage material. As shown in FIG. 9, the seventh variant of the shaped heat storage material 68 is formed in a crisscross prism shape. That is, the shaped heat storage material 68 is composed of a shaped body 69 having a square prism shape and four square prisms 70 extending along side surfaces of the shaped body 69 in the axial direction. Because the shaped heat storage material 68 has a rectangular cross-section, the square prisms 70(A) having a wider side surface and the square prisms 70(B) having a narrow side surface are alternately positioned around the shaped body 69 in the circumference direction. The square prisms 70(A) and 70(B) make void spaces 71 between the square prisms 70(A) and 70(B), and thus increase void ratio of the shaped heat storage material 68.

Figure 10:
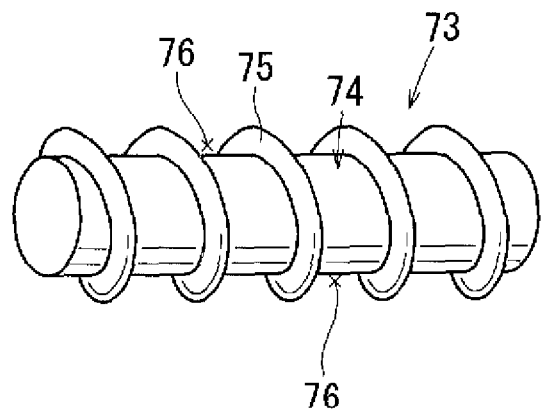
FIG. 10 is a perspective view of an eighth variant of the shaped heat storage material.

FIG. 10 shows an eighth variant of the shaped heat storage material. As shown in FIG. 10, the eighth variant of the shaped heat storage material 73 is formed in a threaded shaft shape. That is, the shaped heat storage material 73 is composed of a shaped body 74 having a circular cylinder shape and a projected rim 75 that is formed in a screw thread shape and projects from an outer circumference surface of the shaped body 74. Thus, the projected rim 75 provided to the shaped body 74 keeps void spaces 76, and thus increases the void ratio of the shaped heat storage material 73.

Figure 11:
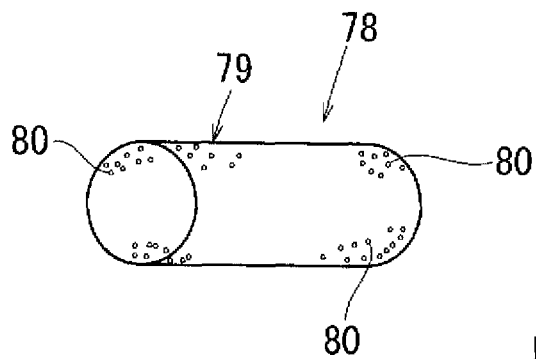
FIG. 11 is a perspective view of a ninth variant of the shaped heat storage material.

FIG. 11 shows a ninth variant of the shaped heat storage material. As shown in FIG. 11, the ninth variant of the shaped heat storage material 78 is composed of a shaped body 79 formed in a porous cylinder shape having many fine pores 80. Thus, the pores 80 of the shaped body 79 increase the void ratio of the heat storage material 78.

Figure 12:
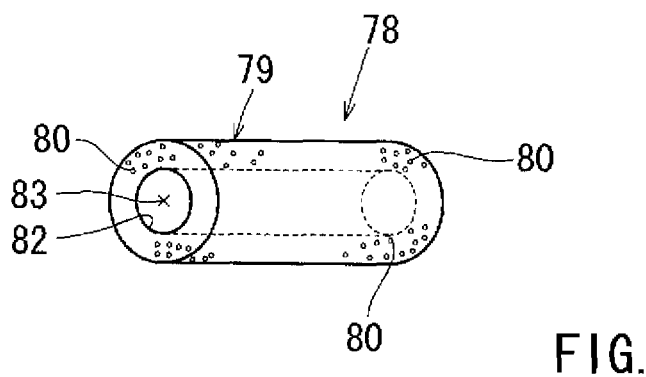
FIG. 12 is a perspective view of a tenth variant of the shaped heat storage material.

FIG. 12 shows a tenth variant of the shaped heat storage material. As shown in FIG. 12, the tenth variant of the shaped heat storage material 78 is composed of the shaped body 79 further having a through-hole 82 passing through the shaped body 79 in the axial direction. The through-hole 82 makes a hollow space 83, and thus increases the void ratio of the shaped heat storage material 78.

Figure 13:
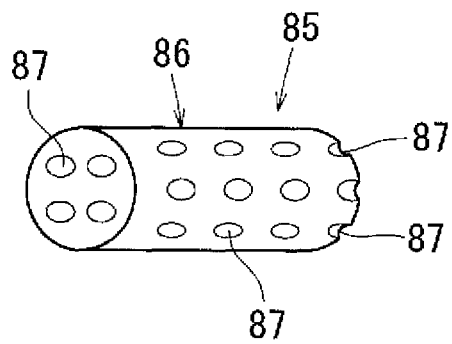
FIG. 13 is a perspective view of an eleventh variant of the shaped heat storage material.

FIG. 13 shows an eleventh variant of the shaped heat storage material. As shown in FIG. 13, the eleventh variant of the shaped heat storage material 85 is composed of a shaped body 86 having many depressed portions 87 formed on a surface (both end surfaces and an outer circumference surface) of the shaped body 86. The depressed portions 87 increase the void ratio of the shaped heat storage material 85.

Figure 14:
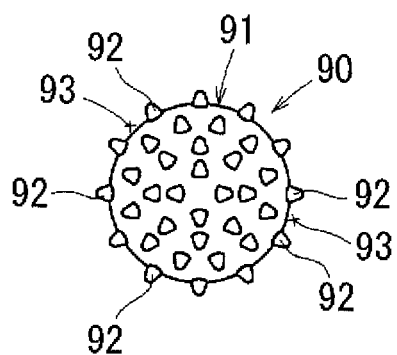
FIG. 14 is a perspective view of a twelfth variant of the shaped heat storage material.

FIG. 14 shows a twelfth variant of the shaped heat storage material. As shown in FIG. 14, the twelfth variant of the shaped heat storage material 90 is composed of a shaped body 91 basically formed in a ball shape and many conical projections 92 protruding from a surface of the shaped body 91. The projections 92 can keep spaces 93, and thus increase the void ratio of the shaped heat storage material 90.

The shaped heat storage material of this disclosure can applied to other apparatuses each requiring a heat storage ability, e.g., for coolant water used for the internal combustion engine, engine oil, transmission oil, or air for air conditioner. In the described embodiment, although the fuel vapor desorbed from the adsorbent is flowed into the air intake pipe, the fuel vapor desorbed from the adsorbent can be flowed into another device (for example, a recovery apparatus for condensing the fuel vapor) due to action of a suction pump.

The invention claimed is:

1. A granular shaped heat storage material comprising:
a shaped body that is composed of a binder and heat storage capsules containing a heat storage material therein and is formed in one of a hollow cylinder structure having one slit that extends in an axial direction and passes through the hollow cylinder structure, a hollow cylinder structure having a closed end, a threaded shaft shape, a shaped body basically formed in one of a ball shape and a prism shape, and having many depressed portions formed on a surface thereof, and a shaped body basically formed in one of a ball shape, a cylindrical shape and a prism shape, and having many conical projections protruding from a surface thereof.

2. The shaped heat storage material according to claim 1, wherein the shaped body is formed in a concave polygonal prism shape.

3. The shaped heat storage material according to claim 1, wherein the shaped body is a hollow structure having voids therein.

4. The shaped heat storage material according to claim 1, wherein the hollow space of the hollow cylinder having one slit is a hole passing through the shaped body.

5. The shaped heat storage material according to claim 4, wherein the shaped body has a partition dividing the hollow space into a plurality of parts extending in an axial direction of the shaped body.

6. An adsorbent canister comprising:
a housing;
an adsorbent housed in the housing; and
a granular shaped heat storage material housed in the housing and having a shaped body that is composed of a binder and heat storage capsules containing a heat storage material therein and is formed in one of a hollow cylinder structure having one slit that extends in an axial direction and passes through the hollow cylinder structure, a hollow cylinder structure having a closed end, a threaded shaft shape, a shaped body basically formed in one of a ball shape, a cylindrical shape and a prism shape, and having many depressed portions formed on a surface thereof, and a shaped body basically formed in one of a ball shape and a prism shape, and having many conical projections protruding from a surface thereof.

* * * * *